United States Patent
Itoh

(10) Patent No.: US 7,368,900 B2
(45) Date of Patent: May 6, 2008

(54) CONSTANT VOLTAGE CIRCUIT AND CONSTANT CURRENT SOURCE, AMPLIFIER, AND POWER SUPPLY CIRCUIT USING THE SAME

(75) Inventor: Kohzoh Itoh, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/710,192

(22) Filed: Feb. 22, 2007

(65) Prior Publication Data

US 2007/0159155 A1    Jul. 12, 2007

Related U.S. Application Data

(63) Continuation of application No. 11/189,607, filed on Jul. 25, 2005, now Pat. No. 7,202,655.

(30) Foreign Application Priority Data

Jul. 28, 2004    (JP) .............................. 2004-220261

(51) Int. Cl.
*G05F 3/16* (2006.01)
(52) U.S. Cl. ...................... 323/316; 323/313; 327/543
(58) Field of Classification Search ........ 323/311–316, 323/274, 317; 327/90–96, 538, 539–545
See application file for complete search history.

(56) References Cited

U.S. PATENT DOCUMENTS

| 5,536,504 A | 7/1996 | Eugster et al. |
| 5,774,013 A | 6/1998 | Groe |
| 5,856,756 A | 1/1999 | Sasahara et al. |
| 5,986,481 A * | 11/1999 | Kaminishi .................. 327/96 |

FOREIGN PATENT DOCUMENTS

JP    H04-026899    6/1992

* cited by examiner

*Primary Examiner*—Rajnikant B. Patel
(74) *Attorney, Agent, or Firm*—Cooper & Dunham, LLP

(57) ABSTRACT

A constant voltage circuit is disclosed that includes a constant voltage generator circuit part converting an input voltage into a predetermined constant voltage in accordance with an externally input control signal and outputting the constant voltage; a first capacitor connected to the output end of the constant voltage generator circuit part; a second capacitor charging the first capacitor; and a switch circuit part controlling charging and discharging of the second capacitor in accordance with the control signal. The switch circuit part charges the second capacitor and blocks the discharging of the second capacitor to the first capacitor when the constant voltage generator circuit part is caused to stop outputting the constant voltage by the control signal, and stops applying the input voltage to the second capacitor and charges the first capacitor when the constant voltage generator circuit part is caused to start outputting the constant voltage by the control signal.

12 Claims, 6 Drawing Sheets

CONSTANT VOLTAGE CIRCUIT AND CONSTANT CURRENT SOURCE, AMPLIFIER, AND POWER SUPPLY CIRCUIT USING THE SAME

CROSS-REFERENCE TO RELATED APPLICATION

This application is a Rule 1.53(b) Continuation of U.S. Ser. No. 11/189,607 filed Jul. 25, 2005 now U.S. Pat. No. 7,202,655, the entire contents of which are incorporated by reference herein.

BACKGROUND OF THE INVENTION

1. Field of the Invention

The present invention relates generally to constant voltage circuits, constant current sources, amplifiers, and power supply circuits, and more particularly to a constant voltage circuit capable of reducing the charge time of a capacitor for noise prevention, and a constant current source, an amplifier, and a power supply circuit using the constant voltage circuit.

2. Description of the Related Art

In recent years, there has been a demand for power saving also in terms of environmental measures. The importance of reduction in power consumption in apparatuses using batteries, such as cellular phones and digital cameras, is increasing also in terms of extending the useful service life of the batteries. As a result, in those apparatuses, the bias current of an amplifier circuit and the current consumed in a constant voltage circuit such as a reference voltage generator circuit are extremely reduced. Consequently, the circuits themselves have become more susceptible to noise, so that a capacitor for noise absorption is provided in the circuits.

FIG. 1 is a schematic circuit diagram showing a conventional constant voltage circuit 100 that operates in accordance with an external control signal Sc so as to generate and output a predetermined constant voltage Vo1. The external control signal Sc is input to a constant voltage generator circuit part 101. A capacitor 102 for noise control is provided to the output end of the constant voltage circuit 100.

FIG. 2 is a circuit diagram showing a conventional constant voltage power supply circuit that uses a capacitor C10 for noise removal and charges the capacitor C10 quickly (for instance, Japanese Examined Utility Model Application Publication No. 4-26899).

However, the constant voltage circuit 100 shown in FIG. 1 has a problem in that the current used therein is extremely small so that it takes time before the capacitor 102 for noise control is charged to a predetermined voltage, thus requiring time before the output voltage of the constant voltage circuit 100 reaches the predetermined constant voltage Vo1. On the other hand, the constant voltage power supply circuit shown in FIG. 2 requires a circuit that detects that the capacitor C10 for noise removal reaches a predetermined voltage, that is, the voltage Vz of a Zener diode D1.

SUMMARY OF THE INVENTION

Accordingly, it is a general object of the present invention to provide a constant voltage circuit in which the above-described disadvantages are eliminated.

A more specific object of the present invention is to provide a constant voltage circuit that can quickly charge a capacitor for noise prevention without detecting the charge voltage of the capacitor and thus reduce time before the output voltage reaches a predetermined constant voltage.

Another more specific object of the present invention is to provide a constant current source, an amplifier, and a power supply circuit using the constant voltage circuit.

One or more of the above objects of the present invention are achieved by a constant voltage circuit converting an input voltage into a predetermined constant voltage in accordance with an externally input control signal and outputting the predetermined constant voltage, the constant voltage circuit including: a constant voltage generator circuit part configured to convert the input voltage into the predetermined constant voltage in accordance with the control signal and output the predetermined constant voltage; a first capacitor connected to an output end of the constant voltage generator circuit part outputting the constant voltage; a second capacitor configured to charge the first capacitor; and a switch circuit part configured to control charging and discharging of the second capacitor in accordance with the control signal, wherein the switch circuit part charges the second capacitor by applying the input voltage thereto and blocks the discharging of the second capacitor to the first capacitor when the constant voltage generator circuit part is caused to stop outputting the predetermined constant voltage by the control signal; and the switch circuit part stops applying the input voltage to the second capacitor and charges the first capacitor by releasing an electric charge stored in the second capacitor to the first capacitor when the constant voltage generator circuit part is caused to start outputting the predetermined constant voltage by the control signal.

One or more of the above objects of the present invention are also achieved by a constant current source including: a constant voltage circuit converting an input voltage into a predetermined constant voltage in accordance with an externally input control signal and outputting the predetermined constant voltage, the constant voltage circuit including: a constant voltage generator circuit part configured to convert the input voltage into the predetermined constant voltage in accordance with the control signal and output the predetermined constant voltage; a first capacitor connected to an output end of the constant voltage generator circuit part outputting the constant voltage; a second capacitor configured to charge the first capacitor; and a switch circuit part configured to control charging and discharging of the second capacitor in accordance with the control signal, wherein the switch circuit part charges the second capacitor by applying the input voltage thereto and blocks the discharging of the second capacitor to the first capacitor when the constant voltage generator circuit part is caused to stop outputting the predetermined constant voltage by the control signal; the switch circuit part stops applying the input voltage to the second capacitor and charges the first capacitor by releasing an electric charge stored in the second capacitor to the first capacitor when the constant voltage generator circuit part is caused to start outputting the predetermined constant voltage by the control signal; and the constant current source generates a constant current by converting the constant voltage output from the constant voltage circuit into current, and outputs the constant current.

One or more of the above objects of the present invention are also achieved by an amplifier including: a constant current source, the constant current source including a constant voltage circuit converting an input voltage into a predetermined constant voltage in accordance with an externally input control signal and outputting the predetermined constant voltage, the constant voltage circuit including: a constant voltage generator circuit part configured to convert the input voltage into the predetermined constant voltage in accordance with the control signal and output the predetermined constant voltage; a first capacitor connected to an output end of a constant voltage generator circuit part outputting the constant voltage; a second capacitor configured to charge the first capacitor; and a switch circuit part configured to control charging and discharging of the second capacitor in accordance with the control signal, wherein the switch circuit part charges the second capacitor by applying the input voltage thereto and blocks the discharging of the second capacitor to the first capacitor when the constant voltage generator circuit part is caused to stop outputting the predetermined constant voltage by the control signal; the switch circuit part stops applying the input voltage to the second capacitor and charges the first capacitor by releasing an electric charge stored in the second capacitor to the first capacitor when the constant voltage generator circuit part is caused to start outputting the predetermined constant voltage by the control signal; and the constant current source supplies bias current to an amplifier circuit by generating a constant current by converting the constant voltage output from the constant voltage circuit into current.

One or more of the above objects of the present invention are also achieved by a power supply circuit including: an amplifier, the amplifier including a constant current source, the constant current source including a constant voltage circuit converting an input voltage into a predetermined constant voltage in accordance with an externally input control signal and outputting the predetermined constant voltage, the constant voltage circuit including: a constant voltage generator circuit part configured to convert the input voltage into the predetermined constant voltage in accordance with the control signal and output the predetermined constant voltage; a first capacitor connected to an output end of the constant voltage generator circuit part outputting the constant voltage; a second capacitor configured to charge the first capacitor; and a switch circuit part configured to control charging and discharging of the second capacitor in accordance with the control signal, wherein the switch circuit part charges the second capacitor by applying the input voltage thereto and blocks the discharging of the second capacitor to the first capacitor when the constant voltage generator circuit part is caused to stop outputting the predetermined constant voltage by the control signal; the switch circuit part stops applying the input voltage to the second capacitor and charges the first capacitor by releasing an electric charge stored in the second capacitor to the first capacitor when the constant voltage generator circuit part is caused to start outputting the predetermined constant voltage by the control signal; the constant current source supplies bias current to an amplifier circuit by generating a constant current by converting the constant voltage output from the constant voltage circuit into current; the amplifier controls an operation of a transistor connected to an input terminal and an output terminal so that a voltage at the output terminal is a predetermined voltage; and the power supply circuit converts the voltage input to the input terminal into a predetermined voltage and outputs the predetermined voltage from the output terminal.

According to a constant voltage circuit and a constant current source, an amplifier, and a power supply circuit using the constant voltage circuit according to the present invention, a switch circuit part charges a second capacitor by applying an input voltage thereto and blocks the discharging of the second capacitor to a first capacitor when a constant voltage generator circuit part is caused to stop outputting a predetermined constant voltage by a control signal, and stops applying the input voltage to the second capacitor and charges the first capacitor by releasing an electric charge stored in the second capacitor to the first capacitor when the constant voltage generator circuit part is caused to start outputting the predetermined constant voltage by the control signal. Accordingly, by setting a predetermined relationship among the capacitance of the first capacitor, the capacitance of the second capacitor, and the voltages at the time of charging, it is possible to quickly charge the first capacitor to a desired voltage without detecting the charge voltage of the first capacitor. Accordingly, there is no need of voltage detection means that adversely affects a circuit. Further, it is possible to quickly charge the capacitor for noise prevention, so that it is possible to substantially reduce the rise time of the output voltage of the constant voltage circuit and time before a circuit using the constant voltage circuit is stabilized.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given below, with reference to the accompanying drawings, of an embodiment of the present invention.

Figure 1:
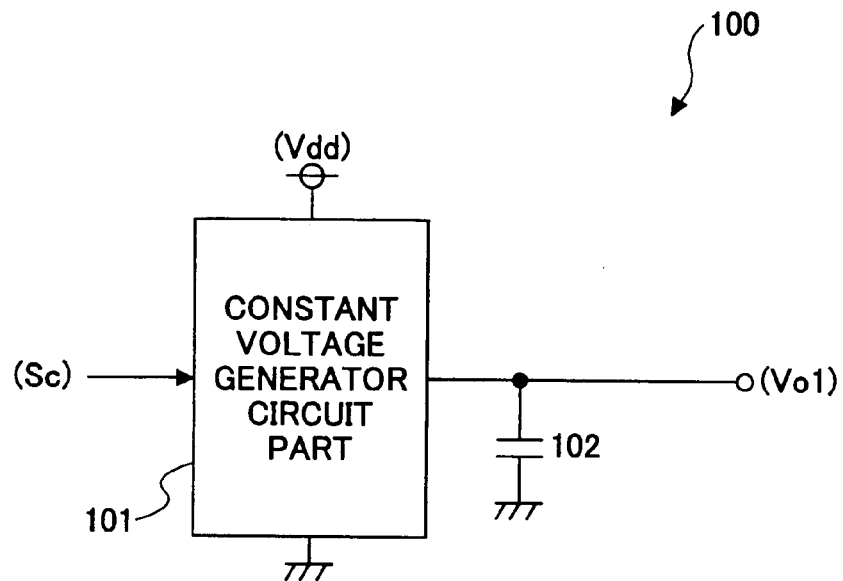
FIG. 1 is a schematic circuit diagram showing a conventional constant voltage circuit.
Figure 2:
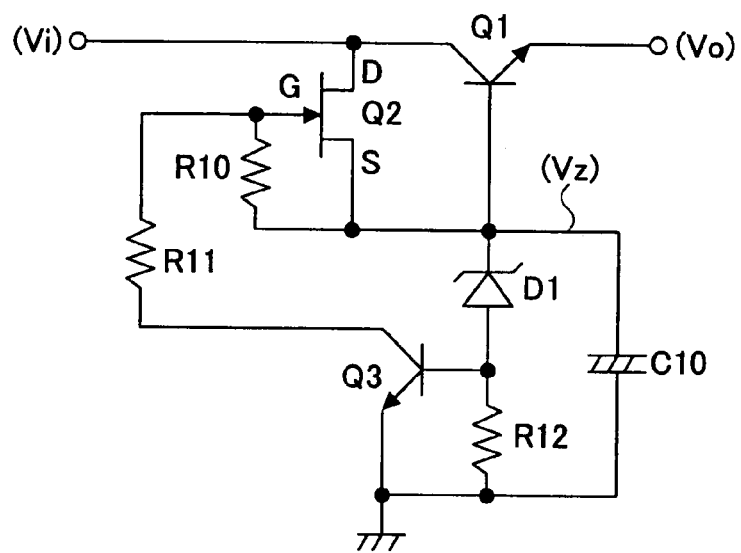
FIG. 2 is a circuit diagram showing a conventional constant voltage power supply circuit.
Figure 3:
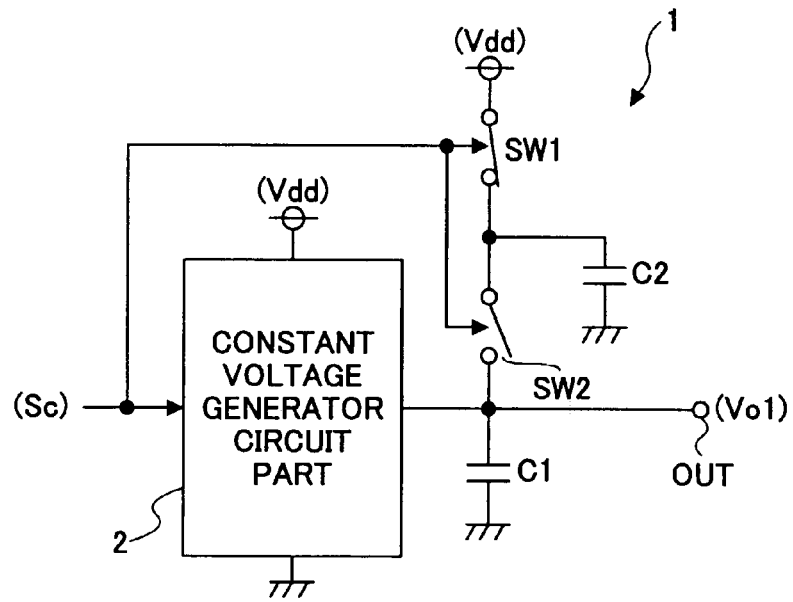
FIG. 3 is a schematic circuit diagram showing a constant voltage circuit according to an embodiment of the present invention.

FIG. 3 is a schematic circuit diagram showing a constant voltage circuit 1 according to the embodiment of the present invention.

Referring to FIG. 3, the constant voltage circuit 1 generates a predetermined constant voltage V1 from an input voltage Vdd that is supply voltage, and outputs the generated voltage V1 from an output terminal OUT as an output voltage Vo1.

The constant voltage circuit 1 includes a constant voltage generator circuit part 2 generating the predetermined constant voltage V1 and outputting it as the output voltage Vo1, capacitors C1 and C2 for noise prevention, and switches SW1 and SW2. The output end of the constant voltage generator circuit part 2 is connected to the output terminal OUT. The capacitor C1 is connected between the output terminal OUT and ground. The capacitor C1 forms a first capacitor, the capacitor C2 forms a second capacitor, and the switches SW1 and SW2 form a switch circuit part. Further, the switch SW1 forms a first switch circuit part, and the switch SW2 forms a second switch circuit part.

The switches SW1 and SW2 are connected in series between Vdd and the output terminal OUT. The capacitor C2 is connected between the connection of the switches SW1 and SW2 and ground. An external control signal Sc is input to each of the constant voltage generator circuit part 2 and the switches SW1 and SW2. The constant voltage generator circuit part 2 performs the output control of the output voltage Vo1 in accordance with the control signal Sc. The switching of each of the switches SW1 and SW2 is controlled by the control signal Sc. For instance, when the control signal becomes HIGH in level, the constant voltage generator circuit part 2 generates and outputs the constant voltage V1, while the switch SW1 turns OFF to be open and the switch SW2 turns ON to be closed. On the other hand, when the control signal Sc becomes LOW in level, the output end of the constant voltage generator circuit part 2 is substantially equalized with ground potential, while the switch SW1 turns ON to be closed and the switch SW2 turns OFF to be open.

According to this configuration, when the control signal Sc is LOW, the output end of the constant voltage generator circuit part 2 is substantially equalized with ground potential. Accordingly, the electric charge of the capacitor C1 is released (that is, the capacitor C1 is discharged) Further, since the switch SW1 turns ON and the switch SW2 turns OFF, the capacitor C2 is quickly charged to the input voltage Vdd. Next, when the control signal Sc becomes HIGH, the capacitor C1 is charged to the constant voltage V1 output from the constant voltage generator circuit part 2. However, since the output current of the constant voltage generator circuit part 2 is small, it takes time to charge the capacitor C1, thus requiring time before the voltage at the output terminal OUT reaches the constant voltage V1. However, since the switch SW2 turns ON at the same time that the switch SW1 turns OFF, the capacitor C1 is also charged by the capacitor C2. Accordingly, the capacitor C1 is charged quickly.

The voltage across the capacitor C1 at the time of completion of charging the capacitor C1 from the capacitor C2 can be substantially equalized with the constant voltage V1 by providing settings to satisfy the following equation:

$$V2/V1=(C1+C2)/C2,$$

where C1 is the capacitance of the capacitor C1, C2 is the capacitance of the capacitor C2, and V2 is the voltage across the capacitor C2 when the control signal Sc is LOW (V2=Vdd).

Thus, it is possible to cause the voltage at the output terminal OUT to quickly reach the constant voltage V1 when the control signal Sc switches from LOW to HIGH. Further, when the constant voltage V1 is output from the output terminal OUT, the capacitors C1 and C2 are connected in parallel between the output terminal OUT and ground. Therefore, no change is caused in properties as a bypass capacitor if the combined capacitance of the capacitors C1 and C2 is equalized with the capacitance of the conventional capacitor used for noise prevention.

Figure 4:
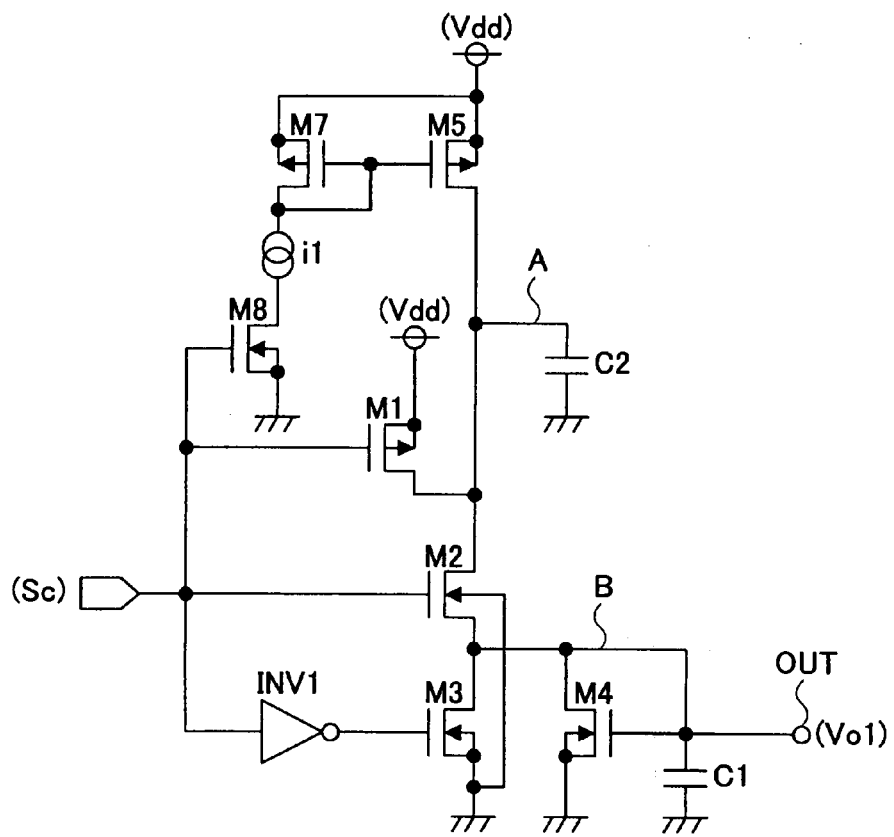
FIG. 4 is a circuit diagram showing a specific configuration of the constant voltage circuit shown in FIG. 3 according to the embodiment of the present invention.

FIG. 4 is a circuit diagram showing a specific configuration of the constant voltage circuit 1 shown in FIG. 3.

Referring to FIG. 4, the constant voltage circuit 1 includes a current source i1, PMOS transistors M1, M5, and M7, NMOS transistors M2 through M4 and M8, an inverter INV1, and the capacitors C1 and C2. The PMOS transistors M5 and M7 form a current mirror circuit that reverses the direction of current supplied from the current source i1. The source of each of the PMOS transistors M5 and M7 is connected to Vdd. The gates of the PMOS transistors M5 and M7 are connected to each other. The connection of the gates of the PMOS transistors M5 and M7 is connected to the drain of the PMOS transistor M7. The current source i1 is connected between the drain of the PMOS transistor M7 and the drain of the NMOS transistor M8. The source of the NMOS transistor M8 is connected to ground. The control signal Sc is input to the gate of the NMOS transistor M8.

The drain of the PMOS transistor M5 is connected to the drain of the NMOS transistor M2. The capacitor C2 and a serial circuit of the NMOS transistors M2 and M3 are connected between the connection A of the drains of the PMOS transistor M5 and the NMOS transistor M2 and ground. The PMOS transistor M1 is connected between Vdd and the connection A. The connection B of the NMOS transistors M2 and M3 is connected to the output terminal OUT. The NMOS transistor M4 and the capacitor C1 are connected in parallel between the connection B and ground. The control signal Sc is input to the gate of each of the PMOS transistor M1 and the NMOS transistor M2. The control signal Sc is input to the gate of the NMOS transistor M3 through the inverter INV1.

According to this configuration, the PMOS transistor M1 forms the switch SW1 of FIG. 3, the NMOS transistor M2 forms the switch SW2 of FIG. 3, and the current source i1, the PMOS transistors M5 and M7, the NMOS transistors M2 through M4 and M8, and the inverter INV1 form the constant voltage generator circuit part 2 of FIG. 3. That is, the NMOS transistor M2, which is a component of the constant voltage generator circuit part 2, also forms the switch SW2 of FIG. 3. When the control signal Sc is HIGH, the constant voltage generator circuit part 2 operates. Meanwhile, when the control signal Sc is LOW, the constant voltage generator circuit part 2 enters a sleep state so as to stop outputting the constant voltage V1.

A description is given of the case where the control signal Sc is LOW.

When the control signal Sc becomes LOW, the NMOS transistors M2 and M8 turn OFF, while the PMOS transistor M1 and the NMOS transistor M3 turn ON. By the NMOS transistor M3 turning ON, the voltage at the connection B is substantially equalized with ground potential, so that the electric charge of the capacitor C1 is released through the NMOS transistor M3. Further, the NMOS transistor M8 turns OFF, so that the supply of current to the drain of the PMOS transistor M7, which forms the input end of the current mirror circuit, is stopped. As a result, no current is output from the drain of the PMOS transistor M5, which forms the output end of the current mirror circuit. Further, the NMOS transistor M2 turns OFF, so that the connection between the connection A and the connection B is broken.

The PMOS transistor M1 turns ON in this state. Accordingly, the capacitor C2 is charged quickly to the input voltage Vdd. If there is no need to charge the capacitor C2 quickly, the PMOS transistor M1 and the NMOS transistor M8 may be omitted, and the constant current source i1 may be connected between the drain of the PMOS transistor M7 and ground. In this case, the capacitor C2 is charged with constant current to the input voltage Vdd by the PMOS transistor M5, which is constantly ON. Thus, when the control signal Sc is LOW, operational current is prevented from flowing into the constant voltage generator circuit part 2, and the capacitor C2 is charged quickly to the input voltage Vdd.

Next, a description is given of an operation in the case where the control signal Sc becomes HIGH.

When the control signal Sc becomes HIGH, the NMOS transistors M2 and M8 turn ON, while the PMOS transistor M1 and the NMOS transistor M3 turn OFF. The NMOS transistor M3 turns OFF, so that the discharging of the capacitor C1 is stopped. The NMOS transistor M8 turns ON, so that current is supplied to the drain of the PMOS transistor M7 forming the input end of the current mirror circuit while current is output from the drain of the PMOS transistor M5 forming the output end of the current mirror circuit. A fixed voltage Vr1 is applied to the gate of the PMOS transistor M5 with the input voltage Vdd serving as a reference voltage. Further, the NMOS transistor M2 turns ON, so that the connection A and the connection B are connected. The PMOS transistor M1 turns OFF in this state, so that the capacitor C2, charged to the input voltage Vdd, is discharged, and the capacitor C1 is charged quickly by the discharging of the capacitor C2. By providing settings such that the above-described equation holds, the voltage across the capacitor C1 at the time of completion of charging the capacitor C1 from the capacitor C2 can be substantially equalized with the above-described constant voltage V1.

The gate voltage of the NMOS transistor M4, that is, the voltage value V1 of the output voltage Vo1, is automatically determined by the value of the output current of the PMOS transistor M5 of the current mirror circuit serving as the drain current of the NMOS transistor M4 and the gate voltage-drain current characteristic of the NMOS transistor M4. The upper limit of the charge voltage of the capacitor C1 is controlled by the output voltage Vo1 (=V1), which is the gate voltage of the NMOS transistor M4. When the voltage across the capacitor C1 reaches the voltage value V1, the output voltage Vo1 becomes constant at the voltage V1.

Thus, by setting the capacitance of each of the capacitors C1 and C2 and the voltages V1 and V2 at the time of charging so that the above-described equation holds, it is possible to quickly charge the capacitor C1 to the target voltage V1 without detecting the charge voltage of the capacitor C1. Accordingly, it is possible to quickly charge the capacitor C1 for noise prevention without using voltage detection means that adversely affects the circuit. Further, the input voltage Vdd may be supplied from a constant voltage source outputting a voltage different from supply voltage. In this case, the voltage supplied from the constant voltage source may be set as V2 in the case of using the above-described equation.

Figure 5:
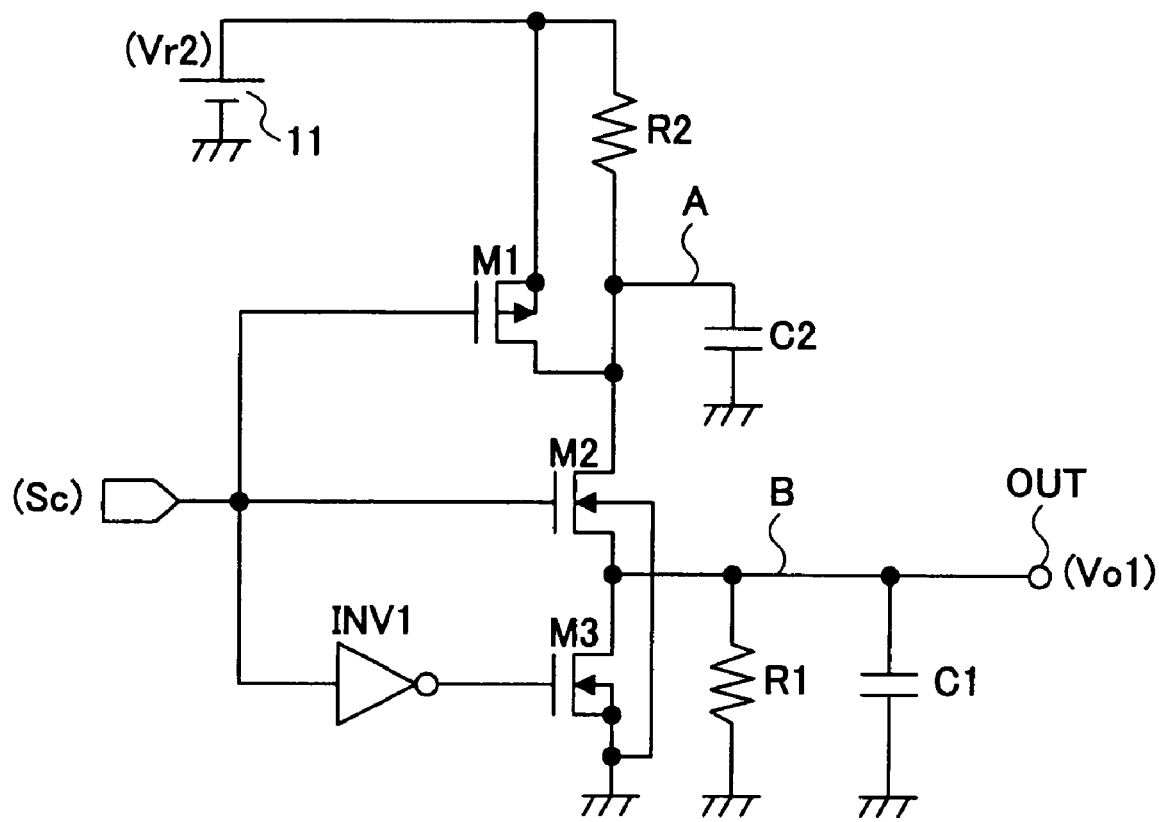
FIG. 5 is a circuit diagram showing another specific configuration of the constant voltage circuit shown in FIG. 3 according to the present invention.

Next, FIG. 5 is a circuit diagram showing another specific configuration of the constant voltage circuit 1 shown in FIG. 3. In FIG. 5, the same elements as or elements similar to those of FIG. 4 are referred to by the same numerals.

Referring to FIG. 5, the constant voltage circuit 1 includes a reference voltage source 11 generating and outputting a predetermined reference voltage Vr2, the PMOS transistor M1, the NMOS transistors M2 and M3, the capacitors C1 and C2, the inverter INV1, and resistors R1 and R2. The resistor R2 is connected between the reference voltage source 11 and the drain of the NMOS transistor M2. The connection of the resistor R2 and the drain of the NMOS transistor M2 is referred to as A.

The PMOS transistor M1 is connected between the reference voltage source 11 and the connection A, and the capacitor C2 is connected between the connection A and ground. The NMOS transistors M2 and M3 are connected in series between the connection A and ground. The connection of the NMOS transistors M2 and M3 is referred to as B. The connection B is connected to the output terminal OUT. The resistor R1 and the capacitor C1 are each connected between the connection B and ground. The control signal Sc is input to the gate of each of the PMOS transistor M1 and the NMOS transistor M2. The control signal Sc is input to the gate of the NMOS transistor M3 through the inverter INV1.

According to this configuration, the PMOS transistor M1 forms the switch SW1 of FIG. 3, the NMOS transistor M2 forms the switch SW2 of FIG. 3, and the reference voltage source 11, the NMOS transistors M2 and M3, the inverter INV1, and the resistors R1 and R2 form the constant voltage generator circuit part 2 of FIG. 3. That is, the NMOS transistor M2, which is a component of the constant voltage generator circuit part 2, also forms the switch SW2 of FIG. 3. The reference voltage Vr2, which corresponds to the input voltage Vdd of FIG. 3, may be generated from the input voltage Vdd by the reference voltage source 11. When the control signal Sc is HIGH, the constant voltage generator circuit part 2 operates. When the control signal Sc is LOW, the constant voltage generator circuit part 2 enters a sleep state so as to stop outputting the constant voltage V1.

Here, a description is given of the case where the control signal Sc is LOW.

When the control signal Sc becomes LOW, the NMOS transistor M2 turns OFF, while the PMOS transistor M1 and the NMOS transistor M3 turn ON. By the NMOS transistor M3 turning ON, the voltage at the connection B is substantially equalized with ground potential, so that the electric charge of the capacitor C1 is released through the NMOS transistor M3. Further, the NMOS transistor M2 turns OFF, so that the connection of the connections A and B, that is, the connection of the resistors R1 and R2, is broken so as to block current flowing from the reference voltage source 11 to the resistor R1 through the resistor R2. The PMOS transistor M1 turns ON in this state, so that the capacitor C2 is quickly charged to the reference voltage Vr2.

Thus, when the control signal Sc is LOW, operational current is prevented from flowing into the constant voltage generator circuit part 2, and the capacitor C2 is charged quickly to the reference voltage Vr2. It is also possible to charge the capacitor C2 via the resistor R2. Accordingly, if there is no need to quickly charge the capacitor C2 in the sleep state where the control signal Sc is LOW, the PMOS transistor M1 may be omitted. Thus, when the control signal Sc is LOW, current flowing through the resistors R2 and R1 is blocked, and the capacitor C2 is charged to the reference voltage Vr2.

Next, a description is given of an operation in the case where the control signal Sc becomes HIGH.

When the control signal Sc becomes HIGH, the NMOS transistor M2 turns ON, while the PMOS transistor M1 and the NMOS transistor M3 turn OFF. By the NMOS transistor M3 turning OFF, the discharging of the capacitor C1 is stopped. The NMOS transistor M2 turns ON, so that the connections A and B are connected. The PMOS transistor M1 turns OFF in this state. Accordingly, the capacitor C2 charged to the reference voltage Vr2 is discharged, so that the capacitor C1 is quickly charged by the discharging of the capacitor C2.

By providing settings such that the above-described equation holds, the voltage across the capacitor C1 at the time of completion of charging the capacitor C1 from the capacitor C2 can be substantially equalized with the above-described constant voltage V1. The upper limit of the charge voltage of the capacitor C1 when the constant voltage generator circuit part 2 is in operation is the same voltage as the voltage drop of the resistor R1, and is controlled by the reference voltage Vr2 and the resistors R1 and R2. The reference voltage Vr2, which serves as a reference for the output voltage Vo1, may be replaced by the input voltage Vdd if stability is satisfied.

Thus, also in FIG. 5, by setting the capacitance of each of the capacitors C1 and C2 and the voltages V1 and V2 at the time of charging so that the above-described equation holds, it is possible to quickly charge the capacitor C1 to the target voltage V1 without detecting the charge voltage of the capacitor C1. Accordingly, it is possible to quickly charge the capacitor C1 for noise prevention without using voltage detection means that adversely affects the circuit and thus to substantially reduce the rise time of the output voltage Vo1.

Figure 6:
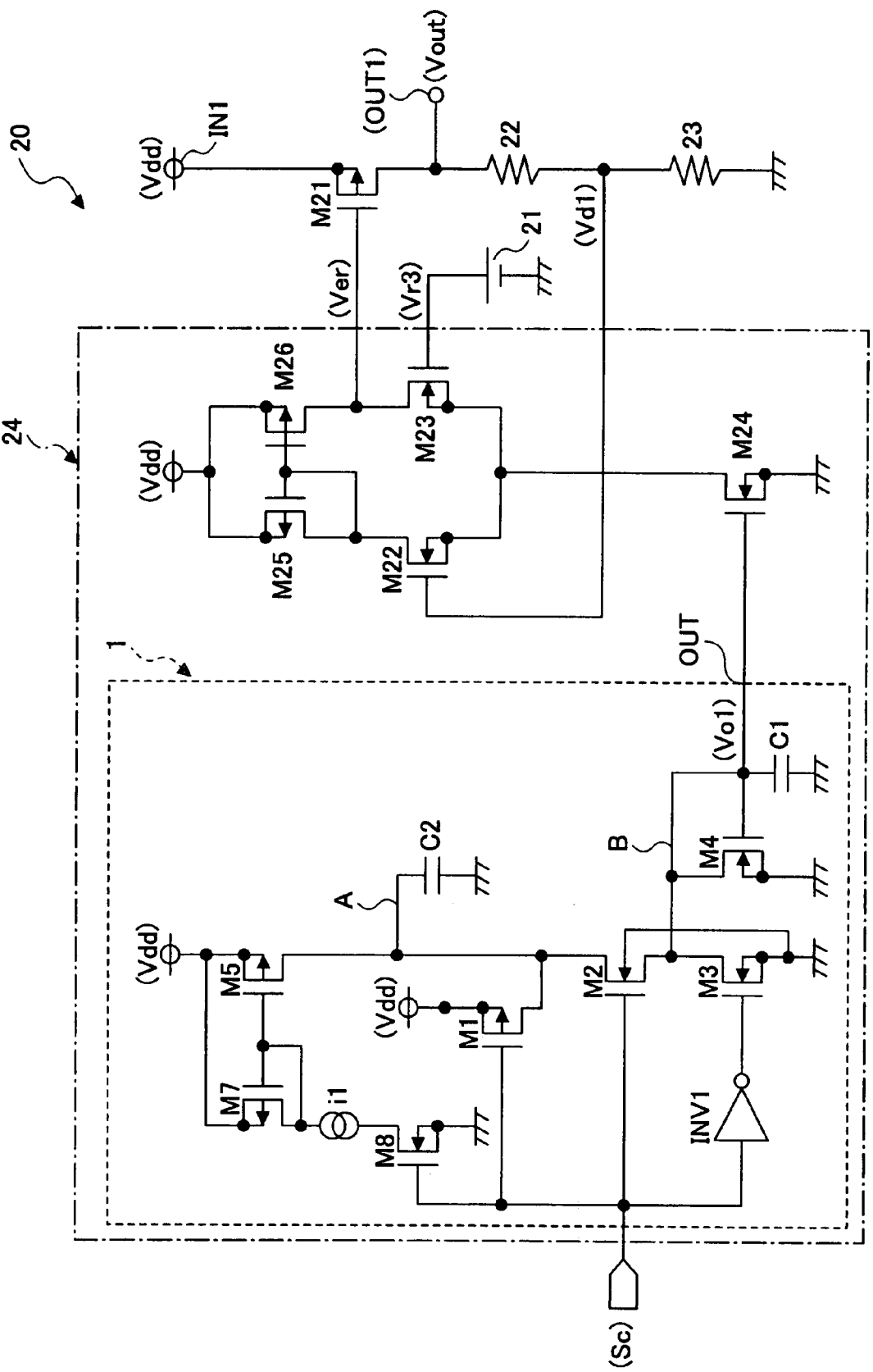
FIG. 6 is a circuit diagram showing the case of applying the constant voltage circuit shown in FIG. 4 to an error amplifier according to the embodiment of the present invention.

Next, FIG. 6 is a circuit diagram showing the case of applying the constant voltage circuit 1 to an amplifier such as an error amplifier, using the constant voltage circuit 1 as a current source supplying bias current to a differential amplifier circuit. FIG. 6 shows a linear regulator 20. In the case of FIG. 6, the constant voltage circuit 1 employs the configuration shown in FIG. 4.

Referring to FIG. 6, the linear regulator 20 generates an output voltage Vout by converting voltage Vdd input to an input terminal IN1, and outputs the generated output voltage Vout from an output terminal OUT1.

The linear regulator 20 includes a reference voltage generator circuit 21, resistors 22 and 23 for output voltage detection, a voltage control transistor M21, and an error amplifier 24. The reference voltage generator circuit 21 generates and outputs a predetermined reference voltage Vr3. The resistors 22 and 23 generate a divided voltage Vd1 by dividing the output voltage Vout, and output the divided voltage Vd1. The voltage control transistor M21, which is formed of a PMOS transistor, controls the output voltage Vout by controlling current output to the output terminal OUT1 in accordance with a signal input to the gate of the voltage control transistor M21. The error amplifier 24 controls the operation of the voltage control transistor M21 so that the divided voltage Vd1 is equalized with the reference voltage Vr3.

The error amplifier 24 includes NMOS transistors M22 through M24, PMOS transistors M25 and M26, and the constant voltage circuit 1. The NMOS transistors M23 and M24 form a differential pair. The PMOS transistors M25 and M26 form a current mirror circuit, and serve as a load on the differential pair. The source of each of the PMOS transistors M25 and M26 is connected to the input terminal IN1 (Vdd). The gates of the PMOS transistors M25 and M26 are connected to each other. The connection of the gates of the PMOS transistors M25 and M26 is connected to the drain of the PMOS transistor M25. The drain of the PMOS transistor M25 is connected to the drain of the NMOS transistor M22. The drain of the PMOS transistor M26 is connected to the drain of the NMOS transistor M23.

The sources of the NMOS transistors M22 and M23 are connected to each other, and the NMOS transistor M24 is connected between the connection of the sources of the NMOS transistors M22 and M23 and ground. The reference voltage generator circuit 21 operates using the input voltage Vdd as power supply. The reference voltage Vr3 is input to the gate of the NMOS transistor M23. The constant voltage V1 from the constant voltage generator circuit 1 is input to the gate of the NMOS transistor M24. The NMOS transistor M24 and the constant voltage circuit 1 form a constant current source. The divided voltage Vd1 is input to the gate of the NMOS transistor M22. The connection of the PMOS transistor M26 and the NMOS transistor M23 is connected to the gate of the voltage control transistor M21. According to this configuration, the error amplifier 24 controls the operation of the voltage control transistor M21 so that the divided voltage Vd1 is equalized with the reference voltage Vr3, thereby controlling the output current of the voltage control transistor M21.

Figure 7:
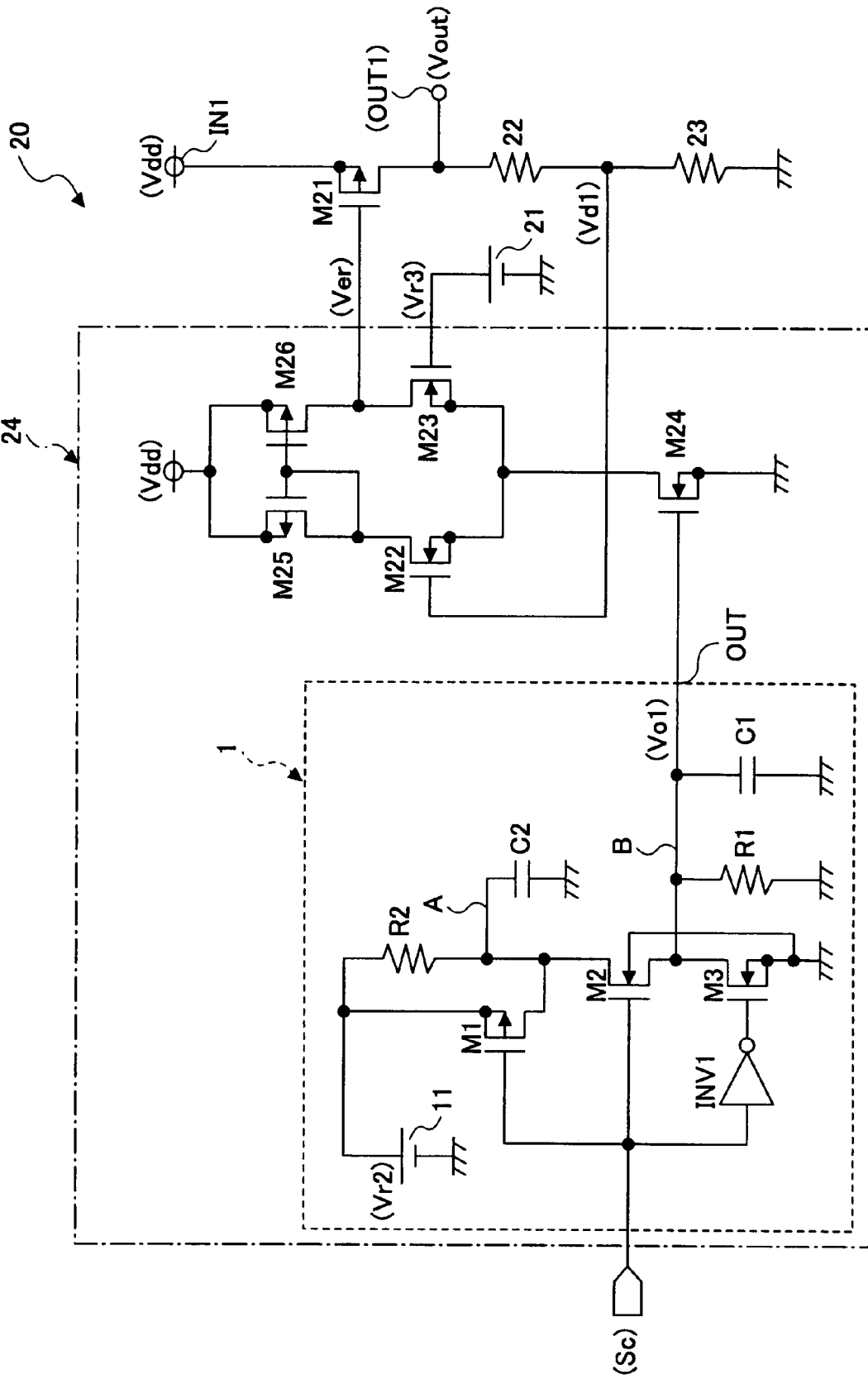
FIG. 7 is a circuit diagram showing the case of applying the constant voltage circuit shown in FIG. 5 to the error amplifier according to the embodiment of the present invention.

FIG. 6 shows the case where the constant voltage circuit 1 employs the configuration shown in FIG. 4. When the constant voltage circuit 1 employs the configuration shown in FIG. 5, the circuit configuration of the linear regulator 20 is as shown in FIG. 7.

Figure 8:
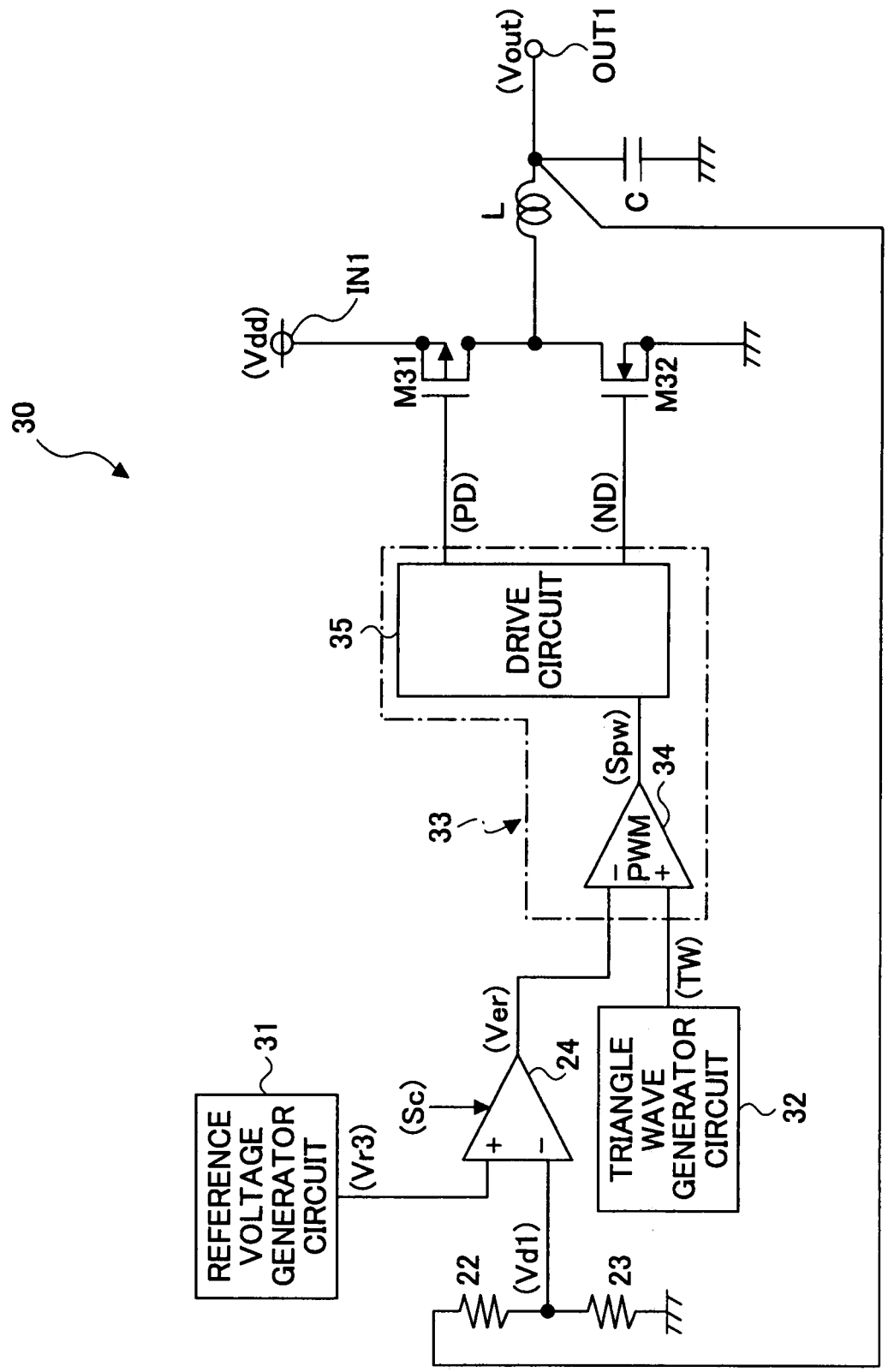
FIG. 8 is a circuit diagram showing other usage of the error amplifier using the constant voltage circuit according to the embodiment of the present invention.

In the case of a switching regulator, a circuit configuration is as shown in FIG. 8. FIG. 8 shows a step-down switching regulator 30. In FIG. 8, the same elements as or elements similar to those of FIG. 6 are referred to by the same numerals.

Referring to FIG. 8, the step-down switching regulator 30 converts input voltage Vdd input to the input terminal IN1 into a predetermined voltage, and outputs the predetermined voltage from the output terminal OUT1.

The switching regulator 30 includes a switching transistor M31, a transistor for synchronous rectification (a synchronous rectifier transistor) M32 formed of an NMOS transistor, an inductor L and a capacitor C for smoothing, and the resistors 22 and 23 for output voltage detection. The switching transistor M31, which is formed of a PMOS transistor, controls the outputting of the input voltage Vdd input to the input terminal IN1. The resistors 22 and 23 generate a divided voltage Vd1 by dividing an output voltage Vout output from the output terminal OUT1, and output the divided voltage Vd1.

The switching regulator 30 further includes a reference voltage generator circuit 31, the error amplifier 24, a triangle wave generator circuit 32, and a PWM control circuit 33. The reference voltage generator circuit 31 generates and outputs a predetermined reference voltage Vr3. The error amplifier 24 compares the divided voltage Vd1 and the reference voltage Vr3, and generates and outputs a voltage Ver according to the comparison result. The triangle wave generator circuit 32 generates and outputs a triangle wave signal TW of a predetermined frequency. The PWM control circuit 33 controls the switching of the switching transistor M31 and the synchronous rectifier transistor M32 by performing PWM control of the switching transistor M31 and the synchronous rectifier transistor M32 based on the output voltage Ver of the error amplifier 24 and the triangle wave signal TW output from the triangle wave generator circuit 32.

On the other hand, the PWM control circuit 33 includes a PWM circuit 34 and a drive circuit 35. The PWM circuit 34 generates a pulse signal Spw for performing PWM control from the output voltage Ver of the error amplifier 24 and the triangle wave signal TW output from the triangle wave generator circuit 32, and outputs the generated pulse signal Spw. The drive circuit 35 generates a control signal PD for controlling the switching of the switching transistor M31 and a control signal ND for controlling the switching of the synchronous rectifier transistor M32 in accordance with the pulse signal Spw from the PWM circuit 34, and drives the switching transistor M31 and the synchronous rectifier transistor M32.

The switching transistor M31 and the synchronous rectifier transistor M32 are connected in series between the input terminal IN1 and ground. The inductor L is connected between the connection of the switching transistor M31 and the synchronous rectifier transistor M32 and the output terminal OUT1. The capacitor C and a series circuit of the resistors 22 and 23 are connected between the output terminal OUT1 and ground. The connection of the resistors 22 and 23 is connected to the inverting input terminal of the error amplifier 24. The reference voltage Vr3 is input to the non-inverting input terminal of the error amplifier 24.

The output voltage Ver of the error amplifier 24 is output to the inverting input terminal of a comparator forming the PWM circuit 34. The triangle wave signal TW from the triangle wave generator circuit 32 is output to the non-inverting input terminal of the comparator forming the PWM circuit 34. The pulse signal Spw from the PWM circuit 34 is output to the drive circuit 35. The drive circuit 35 outputs the control signal PD for controlling the switching of the switching transistor M31 to the gate of the switching transistor M31, and outputs the control signal ND for controlling the switching of the synchronous rectifier transistor M32 to the gate of the synchronous rectifier transistor M32.

According to this configuration, when the switching transistor M31 performs switching and turns ON, current is supplied to the inductor L. At this point, the synchronous rectifier transistor M32 is OFF. When the switching transistor M31 turns OFF, the synchronous rectifier transistor M32 turns ON, so that the energy stored in the inductor L is released through the synchronous rectifier transistor M32. The current generated at this point is smoothed by the capacitor C to be output from the output terminal OUT1. The output voltage Vout output from the output terminal OUT1 is divided by the resistors 22 and 23 for output voltage detection, so that the divided voltage Vd1 is input to the inverting input terminal of the error amplifier 24.

When the output voltage Vout of the switching regulator 30 increases, the output voltage Ver of the error amplifier 24 decreases, so that the duty cycle of the pulse signal Spw from the PWM circuit 34 is reduced. As a result, the ON-period of the switching transistor M31 is reduced, so that control is performed so as to decrease the output voltage Vout of the switching regulator 30. When the output voltage Vout of the switching regulator 30 decreases, the reverse of the above-described operation is performed, so that the output voltage Vout of the switching regulator 30 is controlled to be constant.

The constant voltage circuit 1 shown in FIGS. 3 through 5 may also be employed in the reference voltage generator circuit 21 shown in FIGS. 6 and 7 and the reference voltage generator circuit 31 shown in FIG. 8. In this case, the reference voltage Vr3 output from each of the reference voltage generator circuits 21 and 31 is the output voltage Vo1 of the constant voltage circuit 1. Further, in the above description with reference to FIGS. 6 through 8, the error amplifier 24 is taken as an example of the amplifier using the constant voltage circuit 1. However, the present invention is not limited to this, and is also applicable to those amplifiers in general requiring the supply of constant current bias and those amplifiers in general having reference voltage input.

Thus, according to the constant voltage circuit 1 according to this embodiment, when the control signal Sc is LOW, the switch SW1 turns ON and the switch SW2 turns OFF, so that the electric charge of the capacitor C1 is released and the capacitor C2 is quickly charged to the voltage Vdd. On the other hand, when the control signal Sc becomes HIGH, the switch SW1 turns OFF and the switch SW2 turns ON, so that the capacitor C1 is quickly charged from the capacitor C2. This makes it possible to quickly charge the capacitor C1 for noise prevention without detecting the charge voltage of the capacitor C1, thus making it possible to reduce time before the output voltage reaches a predetermined constant voltage.

The present invention is not limited to the specifically disclosed embodiment, and variations and modifications may be made without departing from the scope of the present invention.

The present application is based on Japanese Priority Patent Application No. 2004-220261, filed on Jul. 28, 2004, the entire contents of which are hereby incorporated by reference.

The invention claimed is:

1. A constant current source including a constant voltage circuit, the constant voltage circuit comprising:
   a constant voltage generator circuit part configured to convert an input voltage into a constant voltage in accordance with a control signal, and output the constant voltage;
   a first capacitor connected to an output of the constant voltage generator circuit part; and
   control means for causing the first capacitor to be charged without detecting a charge voltage of the first capacitor,
   wherein the charging of the first capacitor is blocked when the control signal causes the constant voltage generator circuit part to stop outputting the predetermined constant voltage, and the charging of the first capacitor resumes when the control signal causes the constant voltage generator circuit part to start outputting the predetermined constant voltage.

2. An amplifier including a constant current source and the constant current source in turn including a constant voltage circuit, the constant voltage circuit comprising:
   a constant voltage generator circuit part configured to convert an input voltage into a constant voltage in accordance with a control signal, and output the constant voltage;
   a first capacitor connected to an output of the constant voltage generator circuit part; and
   control means for causing the first capacitor to be charged without detecting a charge voltage of the first capacitor,
   wherein the charging of the first capacitor is blocked when the control signal causes the constant voltage generator circuit pan to stop outputting the predetermined constant voltage, and the charging of the first capacitor resumes when the control signal causes the constant voltage generator circuit part to stan outputting the predetermined constant voltage.

3. A power supply circuit including an amplifier, the amplifier in turn including a constant current source, the constant current source in turn including a constant voltage circuit, the constant voltage circuit comprising:
   a constant voltage generator circuit part configured to convert an input voltage into a constant voltage in accordance with a control signal, and output the constant voltage;
   a first capacitor connected to an output of the constant voltage generator circuit part; and
   control means for causing the first capacitor to be charged without detecting a charge voltage of the first capacitor,
   wherein the charging of the first capacitor is blacked when the control signal causes the constant voltage generator circuit part to stop outputting the predetermined constant voltage, and the charging of the first capacitor resumes when the control signal causes the constant voltage generator circuit part to start outputting the predetermined constant voltage.

4. The constant current source as claimed in claim 1, wherein the current source comprises a second capacitor configured to charge the first capacitor.

5. The constant current source as claimed in claim 4, wherein a switch circuit part is configured to control charging and discharging of the second capacitor in accordance with the control signal.

6. The constant current source as claimed in claim 4, wherein the control means sets a predetermined relationship among the capacitance of the first capacitor, the capacitance of the second capacitor, and the voltages at the time of charging.

7. The amplifier as claimed in claim 2, wherein the amplifier comprises a second capacitor configured to charge the first capacitor.

8. The amplifier as claimed in claim 7, wherein a switch circuit part is configured to control charging and discharging of the second capacitor in accordance with the control signal.

9. The amplifier as claimed in claim 7, wherein the control means sets a predetermined relationship among the capacitance of the first capacitor, the capacitance of the second capacitor, and the voltages at the time of charging.

10. The power supply circuit as claimed in claim 3, wherein the power supply circuit comprises a second capacitor configured to charge the first capacitor.

11. The power supply circuit as claimed in claim 10, wherein a switch circuit part is configured to control charging and discharging of the second capacitor in accordance with the control signal.

12. The power supply circuit as claimed in claim 10, wherein the control means sets a predetermined relationship among the capacitance of the first capacitor, the capacitance of the second capacitor, and the voltages at the time of charging.

* * * * *